Inventors
Steven Prahacs
Jean J. O. Gravel

United States Patent Office 3,365,268
Patented Jan. 23, 1968

3,365,268
PRODUCTION OF AMMONIA FROM THE ORGANIC MATERIALS PRESENT IN SPENT PULPING LIQUORS WITH THE SIMULTANEOUS RECOVERY OF THE PULPING BASE AND SULPHUR VALUES PRESENT IN SAID LIQUORS
Steven Prahacs and Jean J. O. Gravel, Montreal, Quebec, Canada, assignors to Pulp and Paper Research Institute of Canada, Montreal, Quebec, Canada
Filed Aug. 5, 1965, Ser. No. 477,501
Claims priority, application Canada, Aug. 19, 1964, 909,823
10 Claims. (Cl. 23—49)

ABSTRACT OF THE DISCLOSURE

Ammonia is produced from the organic materials present in spent sulphite liquors with the simultaneous recovery of the bulk of the pulping chemical values present in said liquors by a process involving concentrating such liquors and heat treating the concentrated liquor under controlled conditions including the use of oxygen in an amount less than one-quarter of the oxygen required for complete combustion.

This invention relates to the production of ammonia from the organic materials present in spent pulping liquors with the simultaneous recovery of the pulping chemical values present in said liquors.

Many proposals have been made relating to the recovery of pulping chemicals from spent liquors. However, no satisfactory process has been developed for recovering values from the remaining organic content. Certain processes have been developed which recover special organic chemicals such as acetic acid, formic acid, ethyl alcohol or vanillin from spent pulping liquors. However, the markets for these products are limited in comparison with the large amount of spent liquor which is produced. A further consideration is that increasing interest in the avoidance of water pollution makes it necessary to dispose of this organic content.

The object of this invention is the production of a useful tonnage chemical namely ammonia from essentially the total organic portion of the spent pulping liquors, under conditions in accordance with which the bulk of the pulping chemicals is simultaneously recovered.

The waste liquor which can be processed in accordance with the present invention can be any sodium or ammonium, base liquor including kraft liquors. It is also possible to produce ammonia in accordance with this invention from the various above-mentioned liquors if the bulk of the base has been removed by ion exchange, electrodialysis or other suitable methods, previous to the pyrolytic or partial oxidation treatment of the organic matter, which in all the cases is mostly lignin compounds. Spent sodium base neutral sulphite semichemical pulping liquor will be primarily used here in illustrating the typical features of the present invention. Except for certain variations in the method of recovery of the pulping chemicals, the production of ammonia from the organic portion of other spent liquors is very similar.

In accordance with this invention a method is provided which comprises the steps of concentrating the waste liquor to a solids concentration of 15 to 70% by weight, heat treating the concentrated liquor in the absence of sufficient oxygen to produce fusion of the solid product, or in the case of sodium base liquors containing sulphur, the formation of substantial amounts of sulphates, thiosulphate or elementary sulphur. The heat treatment is furthermore at a temperature of 600 to 900° C. and produces the bulk of the sodium in the form of its carbonate, the bulk of the sulphur in the form of hydrogen sulphide and most of the organic content of the spent liquor in the form of hydrogen, methane, carbon dioxide and carbon monoxide. In the case of ammonia base liquors, the bulk of the ammonia present in the spent liquor also goes into the gas phase upon pyrolysis and a large fraction of it decomposes into hydrogen and nitrogen. After condensation of the steam, the hydrogen sulphide, preferably together with the carbon dioxide is separated from the remainder of the gaseous product of the heat treatment, and sulphur values are recovered in the form of hydrogen sulphide. The hydrogen can be converted directly into ammonia. The carbon monoxide and methane can be further reacted to produce hydrogen and then ammonia. Because of the very small amount of low fusion point ash present in ammonia base liquors, somewhat higher operating temperature, 600 to 1000° C. is possible in the pyrolysis step with this type of liquor.

In the drawing which illustrates the preferred embodiment of this invention;

Figure 1:
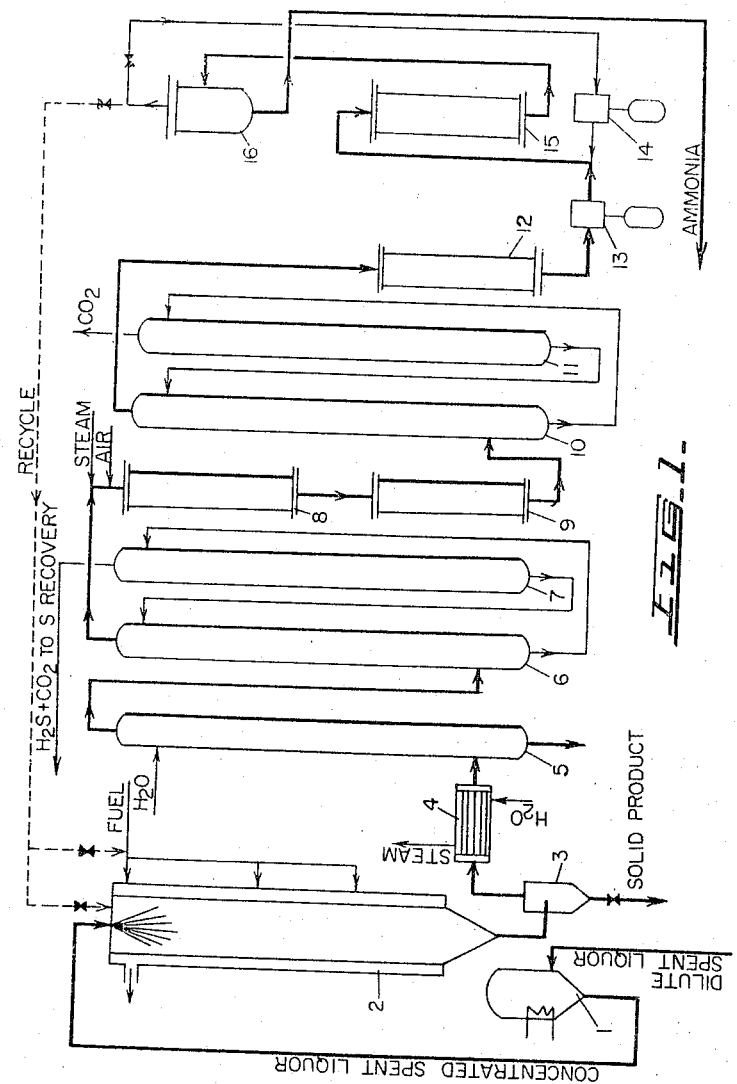
FIGURE 1 is a flow sheet illustrating the manufacture of ammonia and the simultaneous recovery of the bulk of the pulping chemicals in accordance with this invention.

The process of this invention will now be discussed in further detail.

In order to achieve the objectives of the present invention the spent pulping liquor should be concentrated to a higher solids content than that at which it is collected from the digesters and subsequent washing steps otherwise the recovery will be exorbitantly costly due to the large volume of material to be handled and the evaporation of large amounts of water in pyrolysis reactor. The concentration should be between 15 and 70% solids concentration by weight and preferably between 22 and 55% solids concentration by weight.

The concentrated spent liquor is subjected to a high temperature treatment in a suitable reactor such as an AST reactor. The AST reactor and the manner in which it is operated is described in Canadian Patent 552,789 dated February 4, 1958. The heat treatment of the concentrated spent liquor is preferably carried out under purely pyrolytic conditions, i.e., without the addition of air or oxygen. However, as will be shown in one example, the addition of a small amount of air or oxygen can serve the purpose of promoting the gasification by partial oxidation of the organic material. The amount of air or oxygen should not exceed the limit at which fusion of the solid product occurs or at which excessive amounts of sulphates or thiosulphates are produced, nor should it be such as to cause formation of substantial amounts of elementary sulphur in the gas phase. The latter is formed when sulphur dioxide, the oxidation product of hydrogen sulphide, reacts with the remaining hydrogen sulphide in accordance with the following reaction:

$$2H_2S + SO_2 = 3S + 2H_2O$$

The elementary sulphur thus produced is very difficult to recover for use in the reconstituted pulping liquor. The maximum amount of air or oxygen that can be introduced will depend somewhat on the operating conditions but should not exceed the equivalent of one-quarter of the oxygen which would be necessary for full combustion. The total volume of nitrogen introduced where air provides the source of oxygen should preferably be not more than one-third of the volume of hydrogen produced by the process of this invention in order to satisfy the stoichiometry of the ammonia synthesis.

In practising this invention in accordance with the purely pyrolytic method of gasification, ammonia is produced from the organic content of the spent liquor by first partialy or completely gasifying the spent pulping liquor in an AST reactor or other suitable equipment with the exclusion of air or chemically free oxygen. The gasification occurs in two somewhat overlapping stages. In the first stage after the evaporation of the water the organic content of the spent liquor pyrolytically decomposes into a gas of high methane content and into a solid carbonaceous material. In the second stage the solid carbonaceous material further reacts with the water vapour producing gases typical of the so-called water-gas reaction, namely hydrogen, carbon monoxide and carbon dioxide. Other reactions such as reforming of the methane formed in the first stage of gasification and oxidation of the carbon into carbon monoxide by carbon dioxide occur concurrently resulting in a gas mixture consisting mainly of hydrogen, carbon dioxide, carbon monoxide, methane and hydrogen sulphide together with gases such as ethane, olefins and organic sulphur compounds also present in small quantities. If air has been introduced, nitrogen will also appear in the product gas with possible traces of oxygen. Both in the case of the purely pyrolytic treatment and in the case of the partial oxidation process the operating temperature should be between 600 and 900° C. and preferably between 750 and 850° C. Pressure is preferably between atmospheric and 60 p.s.i.g. since low operating pressures show increased yields of hydrogen. However, pressures between 60 and 300 p.s.i.g. may be used without departing from the scope of the invention. The latter pressure range requires higher operating temperatures to obtain similar yields of hydrogen and carbon monoxide but it may be desirable if recovery of the latent heat of the product steam at high pressures is desired.

After separating and collecting the solid products from the gases, in cyclones and/or in other suitable equipment, the condensable portion of the pyrolysis gases are removed by condensation in a heat exchanger or a suitable water scrubber. According to the invention, the hydrogen sulphide content of the gas stream has to be removed and recovered for utilization in reconstituting the pulping liquor. In the case of kraft pulping, the thus recovered hydrogen sulphide itself would be absorbed in the sodium carbonate solution obtained by leaching the solid product of the pyrolysis reaction or in sodium hydroxide produced from the said sodium carbonate. When sulphite type pulping liquor is to be produced, the hydrogen sulphide will be first combusted and the resultant sulphur dioxide adsorbed in the said sodium carbonate solution.

The separation and recovery of hydrogen sulphide can be effected by suitable known methods. One of the methods which can be used involves absorption in a mildly alkaline solution by means of an absorption tower or venturi scrubber followed by desortpion in suitable equipment involving heating, stripping or flashing. Complete absorption of carbon dioxide simultaneously with the hydrogen sulphide is desirable as the carbon dioxide is not required for the ammonia synthesis.

Where the base is ammonia, a large fraction will decompose in the pyrolysis reactor into nitrogen and hydrogen and substantial concentrations of nitrogen will be found in the pyrolysis gases. The decomposition of the ammonia is high favoured by the thermodynamic conditions in the pyrolysis reactor, and decomposition of substantial amounts can be expected when operating at the preferred high temperatures and low pressures. The ammonia not decomposed will mostly condense in the condenser or scrubber after the pyrolysis reactor, and can be recovered by subsequent stripping of the condensate or scrubbing water if the amount present there would justify it.

As previously indicated the hydrogen sulphide together with the carbon dioxide is separated from the remainder of the gaseous product of the heat treatment.

The hydrogen sulphide and the carbon dioxide which have been absorbed can then be recovered in a second stripping or desorbing tower. The recovered hydrogen sulphide can then be burnt either in the pyrolysis furnace with other fuel, or in a sulphur burning furnace or separately, and the resultant sulphur dioxide bearing gas contacted in a suitable absorbing system such as packed towers, venturi scrubbers, etc., with the simultaneously recovered pulping base to obtain the reconstituted pulping liquor.

The hydrogen sulphide-free gas can then pass to the ammonia plant, for further treatment. It consists of hydrogen, carbon monoxide, methane with traces of carbon dioxide, ethane, ethylene, acetylene and possibly some sulphur compounds. Where ammonia is the base, nitrogen will in addition be present.

The gas treatment from this point on can be done according to any of the numerous conventional ammonia processes and they can involve secondary reforming in the presence of limited amount of air, to decrease the amount of methane and to obtain the correct ultimate hydrogen to nitrogen ratio, which should preferably be about 3:1 when entering the converter cycle, corresponding to the stoichiometry of the ammonia synthesis. The secondary reforming can be followed by a one or two stage shift reaction for the removal of carbon monoxide and increase of hydrogen yield according to the following reaction:

$$CO + H_2O \rightarrow CO_2 + H_2$$

One or two stage absorption for the removal of the carbon dioxide is used. Hydrogenation of the olefins and organic sulphur compounds with subsequent hydrogen sulphide removal may also be necessary at one point in the gas preparation process. Methanation (conversion of carbonoxides into methane) and/or absorption of the last traces of carbonoxides may complete the gas treatment. These optional process steps can be carried out at increasing pressures, since the synthesis pressure in the catalytic ammonia converter is usually between 100–1000 atm. A feature of one aspect of the present invention is the mode of utilization of the vent gases from the ammonia synthesis. The venting is necessary to keep the concentration of the inerts under control in the converter. The preferred way of utilizing these vent gases which contain hydrogen, nitrogen, ammonia, methane, ethane and traces of other compounds are argon, is recycling them to the pyrolysis reactor. This will not only assure that the hydrogen and nitrogen content of the gas will be saved, but it also serves to provide the methane concentration called for by the thermodynamic equilibrium in the pyrolysis reactor. By recycling the vent gases, together with some water or steam, the hydrogen yield can be increased very substantially, since practically no organics from the fresh feed will convert into methane. The methane fraction that would otherwise be freshly produced will convert into hydrogen, carbon dioxide and carbon monoxide according to the following equations:

$$CH_4 + 2H_2O = CO_2 + 4H_2$$

$$CH_4 + H_2O = CO + 3H_2$$

This stoichiometry indicates that if this aspect of our invention is utilized, 3 to 4 mols of hydrogen, corresponding to 2 to 2.67 mols of ammonia can be produced from each mol of methane, over the amount of ammonia that will be produced by recycling the hydrogen, nitrogen and ammonia present in the vent gases. A small amount of hydrogen will also be produced from the recycled ethane and other higher paraffins present in the vent gases. A periodic venting or burning may occasionally be advisable if the argon content of the recycle gas becomes substantial.

The process of this invention will further be apparent from FIGURE 1 which shows a flow sheet of a process in accordance with the invention. In FIGURE 1 the dilute spent pulping liquor is fed into an evaporator unit 1 which concentrates the spent liquor to the desired solid content, preferably between 25 and 55% weight solids. The concentrated liquor is fed to a suitable reactor, such as an AST type reactor 2 that is operated in such a manner that gasifies part or all the organic content of the feed, with simultaneous conversion of the bulk of the sodium present in the feed into sodium carbonate and the bulk of the sulphur into hydrogen sulphide. In the case of ammonia base spent liquor, the bulk of the ammonia present in the feed will go to the gas phase where it partially decomposes into hydrogen and nitrogen. The solid products are separated by cyclones or other suitable apparatus 3 from the products of the gas phase, and in the case of sodium base liquors they are leached to obtain a sodium carbonate solution to be used for absorbing hydrogen sulphide or sulphur dioxide and thus reconstituting the pulping liquor.

The hot gas phase is cooled in a waste heat boiler 4 and the condensables and the very fine solid carry-over are removed in a scrubber 5. The gases from here pass into a suitable absorber system 6, 7 where the hydrogen sulphide and the carbon dioxide is absorbed, and the hydrogen sulphide is recovered and later used for reconstituting the pulping liquor.

The hydrogen sulphide free main process gas stream is mixed with steam for further reforming in a suitable reactor 8 where the bulk of the remaining methane is converted into hydrogen and carbon oxides. The reforming is promoted by injection of air, which is preferably introduced at a rate that provides the approximately stoichiometric hydrogen to nitrogen ratio for the ammonia converter further in the process. The next process step is the conversion of the carbon monoxide into carbon dioxide, which is realized in a catalytic shift reactor 9 where the steam reacting with the carbon monoxide produces 1 mol of additional hydrogen for every mol of carbon monoxide converted into carbon dioxide. After another absorption step 10, 11 the bulk of the carbon dioxide is removed, and the remaining carbon oxides are converted into methane in a methanator 12. The purified gas is then compressed to synthesis pressure in a multi-stage compressor 13. The main gas stream combined with the unreacted synthesis gas coming from the recycle compressor 14 is passed into the catalytic ammonia converter 15. The ammonia formed is collected in a separator 16 and can be passed to storage. The bulk of the unreacted gases are recycled via the recycle compressor 14 to the converter. Part of the unreacted gases which are normally vented or burnt to maintain a certain level of inerts (mostly methane) according to the present invention are returned to the pyrolysis reactor, thus assuring not only the conservation of the hydrogen and nitrogen present in the vent gases, but also the extra hydrogen that can be obtained by maintaining the equilibrium methane concentration in the pyrolysis by recycle.

Several modifications of this simplified illustrative example for the production of ammonia from spent pulping liquors are possible without departing from the scope of the present invention. For example, the gasification of the organic content of the spent liquor can be performed in two steps in two reactors in series. These modifications can also relate to the various phases of the gas purification process or to the technical details of the ammonia synthesis, and may include variants of known processes for the synthesis of ammonia.

One peculiar aspect of the implementation of the present invention as related to the ammonia production from spent pulping liquors is that it offers the possibility of complete independence of the pulp mill from any source of pulping chemicals. This situation can be brought about when ammonium hydroxide is used as a pulping base. In this particular case, the main product of the process is used as a pulping chemical, and since the ammonia that can be produced according to the invention is several times the amount necessary to supply the total ammonia requirement of the pulping process there is no need to buy any make-up pulping base from outside sources. In the case of sodium, calcium or magnesium base pulping this is not possible, since part of the spent liquor is not collected, and the recovery of the base in any recovery system can only approach 100% of the collected portion. There is, of course, an unavoidable loss of some sulphur even in the case of applying the present invention, but if relatively high spent liquor collection efficiency is maintained, the losses of sulphur can be made up by using a fuel (coal, oil, or natural gas) which has high sulphur content. These fuels, where available, are usually cheaper than sulphur-free fuels, and the sulphur dioxide which forms upon combustion can be absorbed in the pulping base together or separate from the bulk of the sulphur which is recovered from the spent liquor as described earlier.

Since the novelty of the present invention lies in converting the organic content of spent pulping liquors into gases suitable for the synthesis of ammonia, with simultaneous recovery of pulping chemicals, the examples will relate to experimental data obtained in the pyrolysis reaction part of the present invention, demonstrating how and at what conditions the basic claims of producing these gases with simultaneous recovery of pulping chemicals of good quality can be achieved. A number of experimental runs were performed in a cylindrical 12" I.D., 15' long vertical stainless steel pilot AST reactor. The reactor was electrically heated by six banks of individually controlled radiant heaters. A few additional runs were made in a similar, but smaller reactor (8" I.D., 10' long). The feed was introduced by a high pressure metering pump through a magnetic flowmeter to a cylindrical orifice of suitable size, depending on the feed rate. The feed was superheated to 180–220° C. at 500–800 p.s.i.g. feed pressure, and atomization was achieved by flashing through the feed nozzle orifice into the reactor which was kept at 5 to 60 p.s.i.g. pressure. Neutral sodium sulphite semichemical type spent pulping liquor was used in these experiments. The feed solids concentration was 58±2.5% in most cases, except when the effect of the feed solids concentration was investigated, where lower feed solids concentrations were produced by dilution. The feed solids had a volatile (organic) content of 60±2.0% by weight.

The solid products were collected from the conical bottom and from a cyclone in the outlet line which served to collect the very fine particles. The vapour phase was cooled in a condenser, and the non-condensable gases were metered through an orifice and sampled for analysis. The gas analysis was performed in a modified Orsat type gas analyser.

In all cases the solid residue analysis showed that 88–99% of the sodium present was converted into sodium carbonate, the balance almost entirely into sodium sulphate with 1 to 30% wt. of carbonaceous material remaining on the same residue, the actual values depending on the severity of the pyrolytic treatment.

Figure 2:
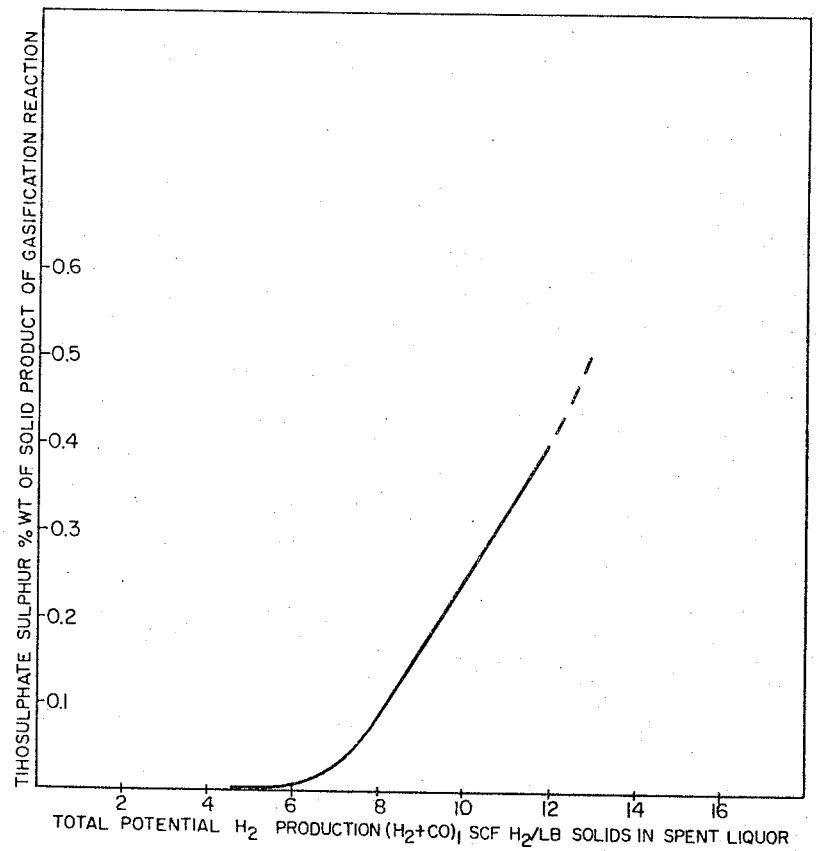
FIGURE 2 is a chart showing the relationship between thiosulphate formation and hydrogen production, in the case of neutral sulphite semichemical spent liquor.

One important finding emerging from the large number of experiments will be presented here in a summary fashion. As has been stated earlier, an important feature of the present invention is that the ammonia can be produced from the spent sodium base liquors in such a manner that the quality of the pulping base recovered is of a good quality, suitable for use in reconstituting the pulping liquor. According to our experimental findings, this condition puts certain limits on the severity of thermal treatment that can be applied to the spent liquor in the pyrolysis step. It was found in the experiments that when aiming at maximum gasification and hydrogen yield in the treatment of the highly concentrated neutral sodium sulphite semi-chemical spent liquor, the highest yields of hydrogen obtained coincided with the start of formation of sodium thiosulphate in the solid product of the pyrolysis reaction. This is an undesirable product in pulping liquor. Only traces or no thiosulphate at all was found in the solid product when operating the pyrolysis reactor at 750 and 800° C. at any feed concentration up to 61% wt. solids. However, when feeding the spent liquor at a reactor operating temperature of 850° C. for the purpose of increasing the hydrogen yield, significant amounts of thiosulphate sulphur appeared in the solid residue concurrently with the increase of hydrogen yield. When the total potential hydrogen yield (including that made available by the carbon monoxide shift reaction) reached about 12 s.c.f. hydrogen/lb. solids fed, the thiosulphate concentration in the solid product increased to 0.40% wt. thiosulphate sulphur, corresponding to 0.99% wt. sodium thiosulphate. Even if this amount of sodium thiosulphate were acceptable for some mills, it is likely to be objectionable for other mills. The trend clearly shows that the yield of hydrogen cannot be increased indefinitely by simply increasing the severity of the pyrolysis, without making the quality of the pulping base unacceptable at a certain point, which point should be determined locally for any pulp producer. The results of the experiments relating to the relationship between hydrogen production and thiosulphate formation are shown in FIGURE 2 in which thiosulphate formation is shown on the vertical axis and total potential hydrogen production is plotted on the horizontal axis for experiments conducted on spent neutral sulphite semi-chemical pulping liquors at 59 plus or minus 2% weight solids in the spent liquor at 800–850° C. reactor temperature and 10 p.s.i.g. reactor pressure.

Of the large amount of experimental data obtained in the work, only a few of the runs will be presented here as illustrative examples for producing gases suitable for the synthesis of ammonia from spent pulping liquors.

EXAMPLE I

This experiment is presented to show the products of pure pyrolysis of spent neutral sulphite semi-chemical liquors at moderate temperatures and low pressure.

Concentrated spent pulping liquor of 60.3% wt. solids content was fed at a rate of 33.5 lb./hr. of solids into the 12″ diameter pilot reactor, which was kept at 750° C. wall temperature and 5 p.s.i.g. pressure. The rate of gas production was 386 s.c.f.h. (dry basis) with the following gas compositions:

| | Percent vol. |
|---|---|
| Hydrogen | 55.0 |
| Carbon dioxide | 25.2 |
| Carbon monoxide | 4.8 |
| Paraffins | [1] 5.0 |
| Unsaturated | 1.0 |
| Hydrogen sulphide | 6.6 |
| Nitrogen | 1.0 |

[1] Mostly $CH_4$.

It was calculated from the above that from 180 tons per day spent liquor solids available for processing, a figure typical for a medium sized pulp mill, 38 tons per day ammonia can be produced at above conditions without recycling the vent gases or by product streams of the synthesis unit, after performing the usual gas purification. A yield of 95% was assumed in the calculation for the ammonia converter and subsequent finishing steps. The above figures are conservative, since they do not take into account the possible increase of yield that can be achieved by recycling the converter vent gases. As it can be calculated, full recycle of the vent gases from the synthesis unit would increase the production rate of ammonia to 45 tons per day, from the same amount of spent liquor.

EXAMPLE II

This experiment was carried out at medium temperature and pressure.

Concentrated spent pulping liquor of 57.7% wt. solid concentration was fed into the 12″ diameter pilot reactor at a solids rate of 70.6 lb./hr. The reactor wall temperature was kept at 800° C. and the reactor pressure was controlled at 30 p.s.i.g. The gas production rate was found to be 871 s.c.f.h. (dry basis) and the product gas showed the following composition:

| | Percent vol. |
|---|---|
| Hydrogen | 56.0 |
| Carbon dioxide | 29.7 |
| Carbon monoxide | 3.8 |
| Paraffins | 5.4 |
| Unsaturated | 0.6 |
| Hydrogen sulphide | 3.5 |
| Nitrogen | 1.0 |

On a similar basis as for Example I, the production rate from 180 tons per day spent liquor solids processed, would be 45 tons per day ammonia without recycling, and 53 tons per day ammonia without recycling, and 53 tons per day ammonia if the synthesis vent gases are fully recycled to the pyrolysis reactor.

EXAMPLE III

This illustration is given for relatively high temperature operation at moderate pressure.

Concentrated spent pulping liquor of 59.8% solids content was fed into the 12″ diameter pilot reactor at a rate of 32.4 lb./hr. solids. The reactor wall temperature was controlled at 850° C., the reactor pressure at 10 p.s.i.g. A gas rate of 567 s.c.f.h. (dry basis) was measured and the gas was found to have the following composition:

| | Percent vol. |
|---|---|
| Hydrogen | 52.6 |
| Carbon dioxide | 20.1 |
| Carbon monoxide | 15.6 |
| Paraffins | 8.5 |
| Unsaturated | 1.0 |
| Hydrogen sulphide | 2.5 |
| Nitrogen | Nil |

On a similar basis as for Example I the production rate from 180 tons per day spent liquor solids processed would be 65 tons per day ammonia without recycling, and 98 tons per day ammonia if the synthesis vent gases are fully recycled to the pyrolysis reactor.

EXAMPLE IV

Operation at a higher pressure is demonstrated by the following experiment:

Concentrated spent pulping liquor of 55.7% wt. solids content was fed at 34.9 lb./hr. solids rate into the 8″ diameter pilot reactor, which was operated at 850° C. wall temperature and 60 p.s.i.g. pressure. The gas rate was found to be 473 s.c.f.h. (dry basis) with the following composition:

| | Percent vol. |
|---|---|
| Hydrogen | 47.8 |
| Carbon dioxide | 26.2 |
| Carbon monoxide | 10.4 |
| Paraffins | 11.4 |
| Unsaturated | 1.6 |
| Hydrogen sulphide | 2.9 |
| Nitrogen | Nil |

On a similar basis as for Example I the production rate from 180 tons per day spent liquor solids processed, would be 40 tons per day ammonia without recycling, and 72 tons per day ammonia if the synthesis vent gases are fully recycled to the pyrolysis reactor.

EXAMPLE V

The effect of dilution of the feed solids is shown by the following experiment:

Spent pulping liquor of 38.1% wt. solids content was fed into the 12″ diameter pilot reactor at a solids rate of 25.1 lb./hr. The reactor wall temperature was controlled at 800° C. and the pressure was kept at 10 p.s.i.g. The product gas rate was 494 s.c.f.h. (dry basis) with the following gas composition:

| | Percent vol. |
|---|---|
| Hydrogen | 58.4 |
| Carbon dioxide | 29.0 |
| Carbon monoxide | 4.4 |
| Paraffins | 3.4 |
| Unsaturated | 1.0 |
| Hydrogen sulphide | 2.4 |
| Nitrogen | 1.4 |

On a similar basis as for Example I the production rate from 180 tons per day spent liquor solids processed, would be 66 tons per day ammonia without recycling, and 81 tons per day ammonia if the synthesis vent gases are fully recycled to the pyrolysis reactor.

EXAMPLE VI

The effect of introducing a small amount of air into the pyrolytic reactor is shown in this experiment.

Concentrated spent pulping liquor of 58.8% wt. solids content was fed into the 12″ diameter pilot reactor at a solids rate of 40.8 lb./hr. Air, preheated to 200° C. was also introduced into the reactor through a perforated ring in the top section of the reactor at a rate of 78 s.c.f.h. to promote the gasification and to supply part of the nitrogen requirement of the ammonia synthesis in the pyrolysis reactor. The reactor was operated at 750° C. wall temperature and 10 p.s.i.g. pressure. A product gas rate of 504 s.c.f.h. (dry basis) was measured, and the analysis showed the following gas composition:

| | Percent vol. |
|---|---|
| Hydrogen | 46.8 |
| Carbon dioxide | 29.0 |
| Carbon monoxide | 3.8 |
| Paraffins | 4.2 |
| Unsaturated | 1.0 |
| Hydrogen sulphide | 3.6 |
| Nitrogen | 11.6 |

On a similar basis as for Example I, the production rate from 180 tons per day spent liquor solids processed, would be 39 tons per day ammonia without recycling, and 52 tons per day ammonia if the synthesis vent gases are fully recycled to the pyrolysis reactor.

We claim:

1. A method of producing ammonia and simultaneously recovering base and sulphur values from sodium base pulping liquors, including, sulphur values, comprising the steps of concentrating such liquors to 15 to 70% by weight solids concentration, heat treating the concentrated liquor in the absence of sufficient oxygen to give fusion of the solid product or the formation of substantial amounts of sulphate, thiosulphate or elementary sulphur and said oxygen being less than one-quarter of the oxygen required for complete combustion, said heat treatment being at a temperature of 600 to 900° C. and producing the bulk of the base in the form of sodium carbonate, the bulk of the sulphur in the form of hydrogen sulphide and most of the organic content of the spent liquor in the form of hydrogen, carbon dioxide, carbon monoxide and methane, recovering the base in the form of sodium carbonate as a solid product of said heat treatment, separating the hydrogen sulphide with the carbon dioxide from the remainder of the gaseous product of the heat treatment by absorption, recovering sulphur values in the form of hydrogen sulphide by desorption, removing carbon dioxide by absorption, converting the hydrogen together with nitrogen into ammonia, and collecting such ammonia.

2. A method as in claim 1 in which a stream of vent gases from the ammonia conversion is recycled to the heat treatment feed so as to suppress the formation of methane and increase the yield of ammonia.

3. A method as in claim 1 in which the temperature of heat treatment is between 750 and 850° C.

4. A method as in claim 1 in which the pulping liquors are concentrated to between 25 and 55% by weight solids concentration.

5. A method as in claim 1 in which the heat treatment is a pyrolytic treatment.

6. A method as in claim 1 in which a stream of vent gases from the ammonia conversion is recycled together with extra water to the heat treatment feed to give an overall ratio of carbon, hydrogen and oxygen similar to that of the fresh feed.

7. A method according to claim 1 in which some of the nitrogen necessary to obtain the proper stoichiometric ratio of hydrogen and nitrogen in the ammonia synthesis is introduced into the pyrolysis heat treatment reactor in the form of air.

8. A method as in claim 1 in which the losses of sulphur in the pulping and recovery cycles are made up at least in part from the products of combustion of a sulphur bearing fuel used for the generation of power and steam in the pulp mill.

9. A method of producing ammonia and simultaneously recovering pulping chemicals from ammonia base spent pulping liquors, including sulphur values, comprising the steps of concentrating such liquors to 15 to 70% by weight concentration, heat treating the concentrated liquor in the absence of sufficient oxygen to give fusion of the solid product or the formation of substantial amounts of elementary sulphur and said oxygen being less than one-quarter of the oxygen required for complete combustion, said heat treatment being at a temperature of 600 to 1000° C., and producing the bulk of the sulphur in the form of hydrogen sulphide and most of the organic content of the spent liquor in the form of hydrogen, carbon dioxide, carbon monoxide and methane, separating the hydrogen sulphide with the carbon dioxide from the remainder of the gaseous product of the heat treatment by absorption, recovering sulphur values in the form of hydrogen sulphide by desorption, removing carbon dioxide by absorption, converting the hydrogen together with nitrogen into ammonia, and collecting such ammonia.

10. A method as in claim 9 in which the losses of ammonia in the pulping and pulp recovery cycles are made up from a part of the ammonia produced from the spent liquors.

References Cited

UNITED STATES PATENTS

| 2,610,106 | 9/1952 | Gray | 23—199 |
| 2,739,039 | 3/1956 | Phelps | 23—48 X |
| 2,966,396 | 12/1960 | Eaton | 23—197 |
| 3,073,672 | 1/1963 | Cederquist | 23—48 |
| 3,083,077 | 3/1963 | Bjorkman et al. | 23—48 |
| 3,236,589 | 2/1966 | Reinhall et al. | 23—48 |

FOREIGN PATENTS

| 258,887 | 1/1928 | Great Britain. |

OTHER REFERENCES

Lee et al., TAPPI, vol. 41, No. 3 (March 1958), pp. 110–116.

MILTON WEISSMAN, *Primary Examiner.*

OSCAR R. VERTIZ, *Examiner.*

G. T. OZAKI, *Assistant Examiner.*